(12) United States Patent
Gutz et al.

(10) Patent No.: US 8,793,673 B2
(45) Date of Patent: Jul. 29, 2014

(54) ALGORITHM COMPLEXITY IDENTIFICATION

(75) Inventors: Steven J. Gutz, Ottawa (CA);
Mohammed Mostafa, Ottawa (CA);
Joshua P. Tessier, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 12/917,677

(22) Filed: Nov. 2, 2010

(65) Prior Publication Data

US 2011/0107316 A1    May 5, 2011

(30) Foreign Application Priority Data

Nov. 4, 2009  (CA) .................................. 2684348

(51) Int. Cl.
*G06F 9/44*        (2006.01)
(52) U.S. Cl.
USPC ........... 717/154; 717/127; 717/128; 717/131; 717/144; 717/157
(58) Field of Classification Search
USPC ....................................................... 717/157
See application file for complete search history.

(56) References Cited

U.S. PATENT DOCUMENTS

| 8,370,821 | B2 * | 2/2013 | Haber et al. | 717/151 |
| 2010/0153925 | A1 * | 6/2010 | Klein | 717/127 |

* cited by examiner

*Primary Examiner* — Don Wong
*Assistant Examiner* — Deric Ortiz
(74) *Attorney, Agent, or Firm* — Law Office of Jim Boice

(57) ABSTRACT

An illustrative embodiment provides a computer-implemented process for algorithm complexity identification through inter-procedural data flow analysis receives a call graph to form a set of received nodes in a static analysis framework, identifies a parent node in the set of received nodes to form an identified parent, traverses the call graph from the identified parent node to a node to identify a function within the node to form an identified function. Each identified function is analyzed to form a complexity value in a set of complexity values. Responsive to a determination that node analysis is complete, and responsive to a determination that path analysis is complete, determines whether path analysis for the identified parent is complete. Responsive to a determination that path analysis for the identified parent is complete, sum the complexity values in the set of complexity values for the identified parent and return the complexity value for the identified parent to a requester.

20 Claims, 5 Drawing Sheets

ALGORITHM COMPLEXITY IDENTIFICATION

CROSS-REFERENCE TO RELATED APPLICATIONS

Pursuant to 35 U.S.C. 119, Applicant claims a right of priority to Canadian Patent Application No. 2,684,348 filed 4 Nov. 2009.

BACKGROUND

This disclosure relates generally to program flow control analysis in a data processing system and, more specifically, to algorithm complexity identification through inter-procedural data flow analysis.

A control flow graph (CFG) of a computer program represents all paths that might be traversed during execution of the computer program. The graph depicts the logic flow in terms of branching and transfer of control among related nodes of the computer program. Many compiler optimizations and static analysis tools typically use a control flow graph.

Each node in the control flow graph represents a basic block. A basic block is a portion of code without any jumps or branches. A target of a branch starts a block, and a branch ends a block. Directed edges represent branches within the control flow. An entry block is used to represent where control enters into the flow graph, and an exit block is used to represent where control flow leaves the block.

Modern day applications are often plagued with performance issues. These issues can result from a number of causes including bad design decisions or poor programming style. Poor programming style is typically more likely than poor design choices. Developers can easily introduce extremely expensive algorithms without realizing what has happened. Inadvertent introduction of expensive algorithms typically occurs by introducing expensive function calls in loop condition checks, using many nested loops, using long-running recursive functions such as functions that terminate in O(n) or greater terms, using loops with expensive function calls and using function-call cycles. The use of big O notation or, Landau notation, provides a description of a function in terms of units, such as iterations in a loop or number of calls to a function or functions.

Unfortunately, simple static analysis tools cannot accurately detect algorithm complexity in a dynamic way when function calls are introduced. Basic abstract syntax trees often do not contain information about the functions and methods that are invoked from different trees. In other words, if a function from class A calls a function from class B, the abstract syntax tree only knows there is a function call from class A. As a result, nothing can be concluded about the complexity of the function of class A.

For example, a code snippet written in Java™ illustrates a function from class A that invokes another function "classB-Function" on an instance of class B.

```
classAFunction(int[ ] arrayOfNumbers, ClassB instance) {
    for (int i=0; i<arrayOfNumbers.length; i++) {
        instance.classBFunction(arrayOfNumbers);
    }
}
```

Simple static analysis tools can only determine that the complexity of the algorithm is O(n), when the complexity could be much greater.

SUMMARY

According to one embodiment, a computer-implemented process for algorithm complexity identification through inter-procedural data flow analysis receives a call graph to form a set of received nodes in a static analysis framework, identifies a parent node in the set of received nodes to form an identified parent, traverses the call graph from the identified parent node to a node to identify a function within the node to form an identified function. Each identified function is analyzed to form a complexity value in a set of complexity values. Responsive to a determination that node analysis is complete, and responsive to a determination that path analysis is complete, determines whether path analysis for the identified parent is complete. Responsive to a determination that path analysis for the identified parent is complete, sum the complexity values in the set of complexity values for the identified parent and return the complexity value for the identified parent to a requester.

According to another embodiment, a computer program product for algorithm complexity identification through inter-procedural data flow analysis is presented. The computer program product comprises a computer recordable-type medium containing computer executable program code stored thereon. The computer executable program code comprises computer executable program code for receiving a call graph to form a set of received nodes in a static analysis framework, computer executable program code for identifying a parent node in the set of received nodes to form an identified parent, computer executable program code for traversing the call graph from the identified parent node to a node, computer executable program code for identifying a function within the node to form an identified function; computer executable program code for analyzing each identified function to form a complexity value in a set of complexity values, computer executable program code responsive to a determination that node analysis is complete, for determining whether path analysis is complete, computer executable program code responsive to a determination that path analysis is complete, for determining whether path analysis for the identified parent is complete, computer executable program code responsive to a determination that path analysis for the identified parent is complete, for summing the complexity values in the set of complexity values for the identified parent, and computer executable program code for returning the complexity value for the identified parent to a requester.

According to another embodiment, an apparatus for algorithm complexity identification through inter-procedural data flow analysis is presented. The apparatus comprises a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit executes the computer executable program code to direct the apparatus to receive a call graph to form a set of received nodes in a static analysis framework, identify a parent node in the set of received nodes to form an identified parent, traverse the call graph from the identified parent node to a node, identify a function within the node to form an identified function, analyze each identified function to form a complexity value in a set of complexity values, responsive to a determination that node analysis is complete, determine whether path analysis is complete, responsive to a determination that path analysis is complete, determine whether path analysis for the identified parent is complete, responsive to a determination that path analysis for the identified parent is complete, sum the complexity values in the set of complexity values for the identified parent, and return the complexity value for the identified parent to a requester.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
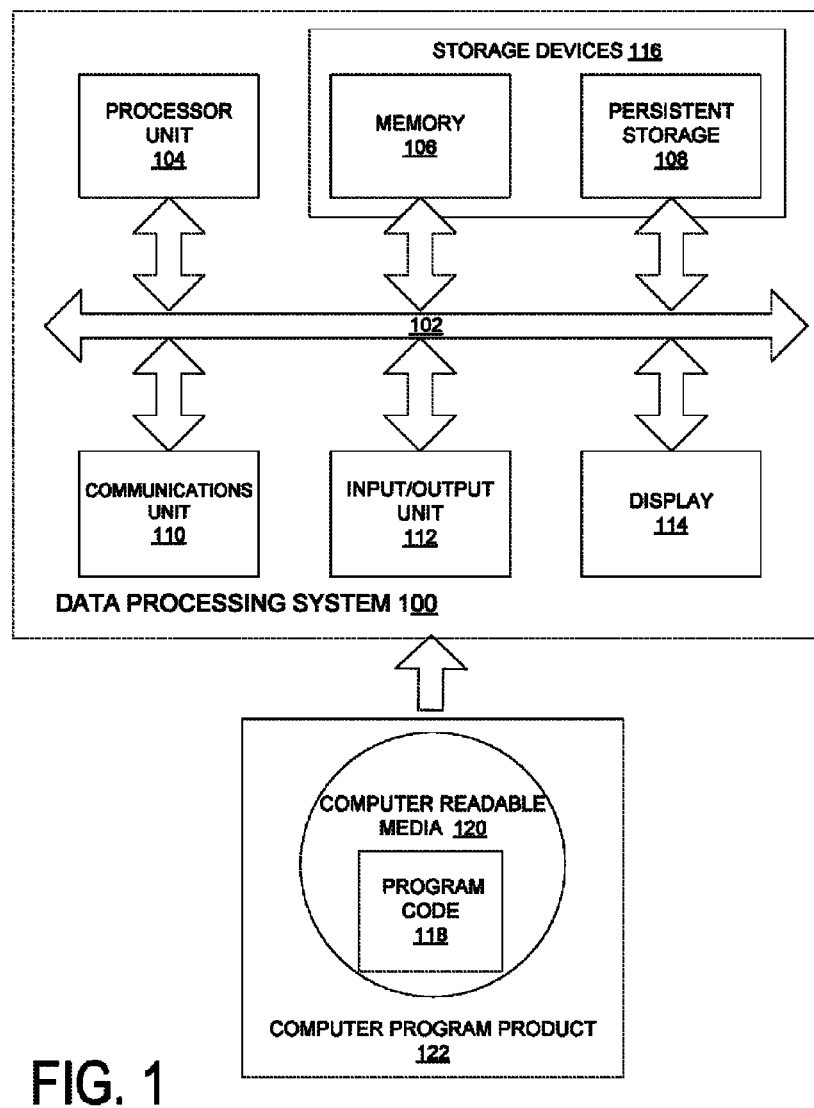
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Any combination of one or more computer readable medium may be utilized. The computer readable medium may be a computer readable signal media or a computer readable storage media. A computer readable storage media may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing. In the context of this document, a computer readable storage media may be any tangible medium that can contain, or store a program for use by or in connection with an instruction execution system, apparatus or device.

A computer readable signal media may include a propagated data signal with computer readable program code embodied therein; for example, in baseband or as part of a carrier wave. Such a propagated signal may take any of a variety of forms, including, but not limited to, electro-magnetic, optical or any suitable combination thereof. A computer readable signal media may be any computer readable medium that is not a computer readable storage media and that can communicate, propagate, or transport a program for use by or in connection with an instruction execution system, apparatus or device. Program code embodied in a computer readable signal media may be transmitted using any appropriate medium, including but not limited to wireless, wire line, optical fiber cable, RF, etc., or any suitable combination of the foregoing.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which, execute on the computer or other programmable apparatus, provide processes for implementing the functions/acts specified in the flowchart and/or block diagram block or blocks.

Turning now to FIG. 1, a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112 and display 114.

Processor unit 104 serves to execute instructions for software that may be loaded into memory 106. Processor unit 104 may be a set of one or more processors or a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, for example and without limitation, data, program code in functional form, and/or other suitable information either on a temporary basis and/or a permanent basis. Memory 106, in these examples may be a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code, which may be read and executed by a processor in processor unit 104. The program code in the different embodiments may be embodied on different physical or tangible computer readable medium, such as memory 106 or persistent storage 108.

Program code 118 is located in a functional form on a computer readable medium 120 that is selectively removable and may be loaded onto or transferred to data processing system 100 for execution by processor unit 104. Program code 118 and computer readable medium 120 form computer program product 122 in these examples. In one example, computer readable medium 120 may be in a tangible form; for example, an optical or magnetic disc that is inserted or placed into a drive or other device that is part of persistent storage 108 for transfer onto a storage device, such as a hard drive that is part of persistent storage 108. In a tangible form, computer readable medium 120 also may take the form of a persistent storage, such as a hard drive, a thumb drive or a flash memory that is connected to data processing system 100. The tangible form of computer readable medium 120 is also referred to as computer recordable storage medium. In some instances, computer readable medium 120 may not be removable.

Alternatively, program code 118 may be transferred to data processing system 100 from computer readable medium 120 through a communications link to communications unit 110 and/or through a connection to input/output unit 112. The communications link and/or the connection may be physical or wireless in the illustrative examples. Computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components, excluding a human being. For example, a storage device may be comprised of an organic semiconductor.

As another example, a storage device in data processing system 100 may be any hardware apparatus that may store data. Memory 106, persistent storage 108 and computer readable medium 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub, which may be present in communications fabric 102.

Using data processing system 100 of FIG. 1 as an example, processor unit 104 receives a call graph through communications unit 110 or from storage devices 115 to form a set of received nodes in a static analysis framework. Processor unit 104 identifies a parent node in the set of received nodes to form an identified parent, traverses the call graph from the identified parent node to a node to identify a function within the node to form an identified function. Each identified function is analyzed by processor unit 104 to form a complexity value in a set of complexity values stored in memory 106 or persistent storage 108. Responsive to a determination that node analysis is complete, and responsive to a determination that path analysis is complete, processor unit 104 determines whether path analysis for the identified parent is complete. Responsive to a determination that path analysis for the identified parent is complete, processor 104 sums the complexity values in the set of complexity values for the identified parent and returns the complexity value for the identified parent to a requester using communications unit 110, input/output unit 112 or storage devices 116.

Processor unit 104 further executes instructions stored in memory 106 or from persistent storage 108. Instructions may further be obtained through communications unit 110, or through input/output unit 112 in the form of program code 118. Processor unit 104 executes program code 118 to perform the sequence of operations just described.

In an alternative embodiment, program code 118 containing the computer-implemented method may be stored within computer readable medium 120 as computer program product 122. In another illustrative embodiment, the process for algorithm complexity identification through inter-procedural data flow analysis may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
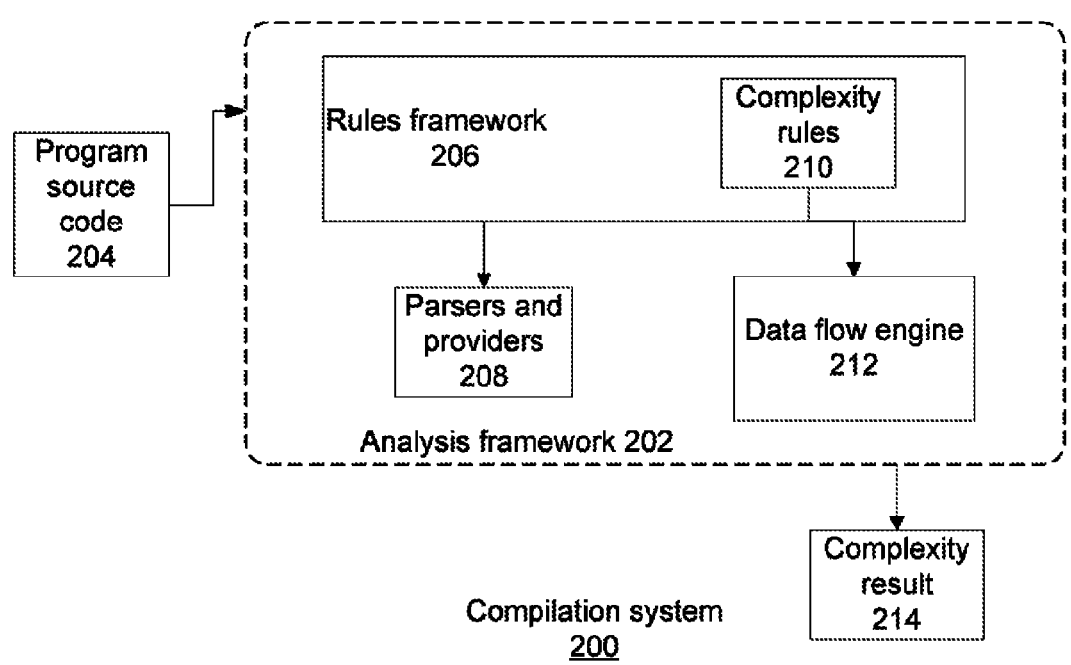
FIG. 2; is a block diagram of an analysis framework that may be implemented within the data processing system of FIG. 1, in accordance with various embodiments of the disclosure.

With reference to FIG. 2, a block diagram of an analysis framework that may be implemented within the data processing system of FIG. 1 in accordance with various embodiments of the disclosure is presented. Compilation system 200 comprises a number of components including input to analysis framework 202 in the form of program source code 204. Analysis framework 202 is provided as an example of a static analysis framework in the illustrative embodiment. The program source code is processed by parsers and providers 208 using rules framework 206. Rules framework 206 further comprises a set of complexity rules 210 for analyzing output of data flow engine 212.

Compilation system 200 is provided as an example implementation of a tool for performing the algorithm complexity identification through inter-procedural data flow analysis. Although shown within compilation system 200, an analysis tool as described may be implemented in another form, such as a standalone tool.

Analysis framework 202 provides a capability of including asymptotical analysis in static analysis tools by introducing an inter-procedural data flow engine, in the form of data flow engine 212, which follows function calls and produces a call graph representative of the flow of an application. By following the call graph produced by data flow engine 212, the static analysis tool of analysis framework 202 can then determine the algorithm complexity of entire branches of execution. The complexity analysis results, such as complexity results 214, typically allow extremely accurate and useful performance problem detection. Performing the analysis also allows the detection and identification of "heavy" recursive calls and function-call cycles.

Analysis framework 202 typically comprises a rules framework and a set of parsers and providers. Rules framework 206 is a set of static analysis rules that detect errors in application or program code such as program source code 204. Parsers and providers 208 is a set of functions that supply rules framework 206 with information required, either by pre-collecting data or providing data on demand, to make assumptions about the application being analyzed.

Complexity rules 210 provide a capability to accurately determine complexity of each branch of execution within a program and report complexity result 214 back to the user or other requester, by leveraging a call graph provided by data flow engine 212. Complexity rules 210 determine the complexity of each function call, and associated branch of execution in the case of nested function calls, and then add it to the complexity of an associated parent function. The rules specify metrics for calculation of complexity. For example, when a function is called within a loop, the function iterations cause the complexity count to be exponential. When a set of function calls occur without nesting, a linear complexity count is summed. For example, classAFunction contains a loop of instructions with the loop further containing a function call of classBFunction. The loop is determined to have $O(n)$ complexity. Using the call-graph to resolve information about the classBFunction call, complexity rules 210 determines that the function call classBFunction has an $O(n)$ complexity as well. By performing an asymptotical analysis, using the complexity information just determined, complexity rules 210 can then determine that the entire function has an $O(n^2)$ complexity. This example is further described in the next two figures.

Figure 3:
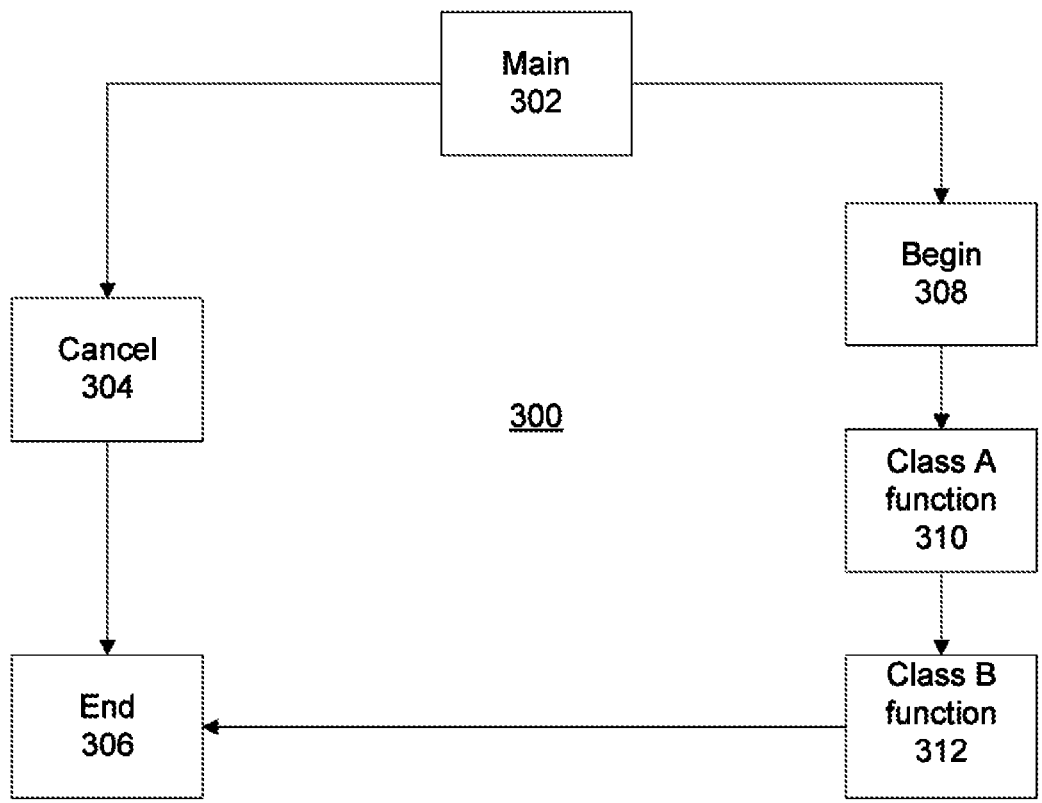
FIG. 3 is a block diagram of a call graph used with the analysis framework of FIG. 2, in accordance with various embodiments of the disclosure.

With reference to FIG. 3, a block diagram of a call graph used with the analysis framework of FIG. 2 in accordance with various embodiments of the disclosure is presented. Call graph 300 is an example of a call graph typically generated by data flow engine 212 of analysis framework 202 of FIG. 2.

Call graph 300 is a simple call graph that illustrates an initial node as main 302 having two branches or paths. A first branch includes functions of cancel 304 and end 306. Each function on this path contains no other function. Note that cancel 304 is a child node with respect to parent node 302.

A second branch, or path, includes a function of begin 308 that includes a function of classAfunction 310 and a further function of classBfunction 312. The second branch, as well as the first branch, ends at end 306.

Figure 4:
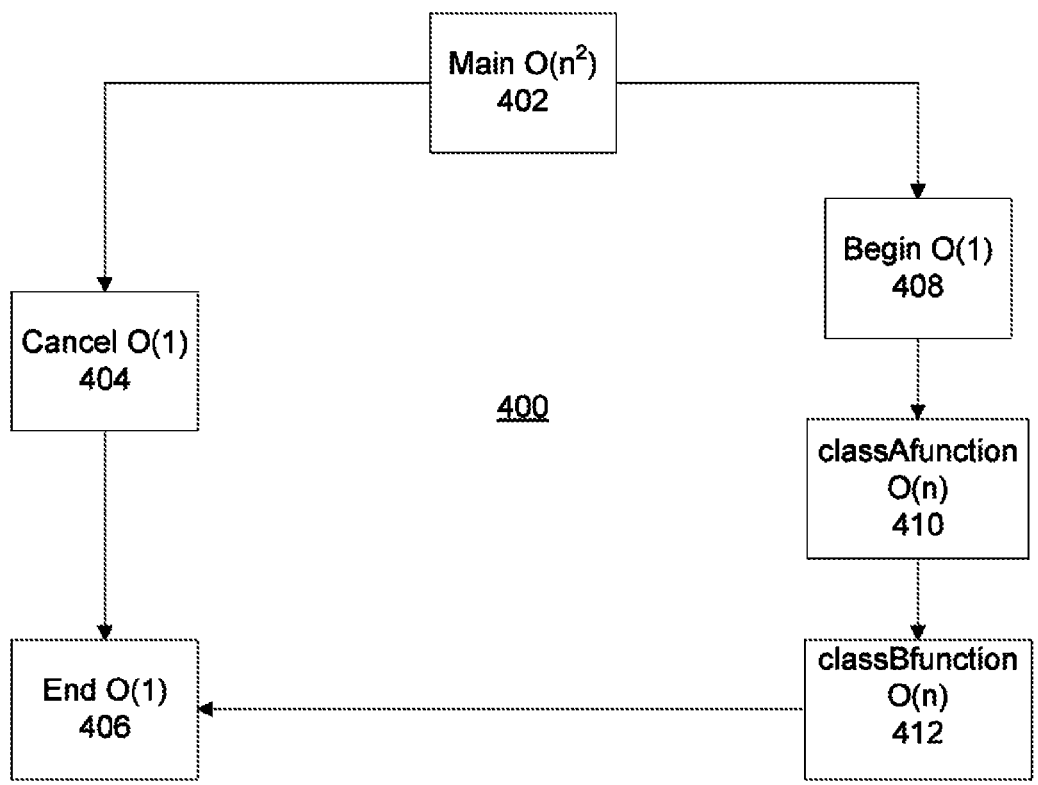
FIG. 4 is a block diagram of a call graph processed by the analysis framework of FIG. 2, in accordance with various embodiments of the disclosure.

With reference to FIG. 4, a block diagram of a call graph processed with the analysis framework of FIG. 2 in accordance with various embodiments of the disclosure is presented. Call graph 400 is an example of a call graph generated by data flow engine 212 and further processed by rules framework 206 of analysis framework 202 of FIG. 2.

Call graph 400 is typically prepared by data flow engine 212 as a simplified call graph. A simplified call graph typically has extraneous nodes removed to further reduce processing by complexity rules 210. Extraneous nodes are those nodes that do not participate in the program flow. For example, extraneous nodes represent dead branches or code that is not used, but still exists in the code being analyzed. The extraneous nodes represent wasted processing resources when analyzed and may also distort a complexity result.

Landau notation is used to indicate the complexity of a function. The notation format uses a big letter O followed by a value indicative of an algorithm complexity. O(1) represents a constant growth rate, wherein as the size of the input increases, the amount of time required to perform the algorithm does not increase. For example, when computing the size of a list, typically the size is tracked as the list grows, so when requested a size may be given in a response. The O(1) answer provides a response of the tracked value. An O(n) answer requires iteration through each element one by one and counting how many elements are in the list. The notation then provides several forms of output, including O(1)—Constant, O(log N)—Logarithmic, O(n)—Linear, O(n^2)—Quadratic, O(n^3)—Cubic, . . . and O(x^n)—Exponential. For example, function main 402 has an associated value of O(1) indicating a constant expression typically containing another simple function. Similar values are seen for functions cancel O(1) 404, end O(1) 406 and begin O(1) 408.

However functions such as classAfunction O(n) 410 and classBfunction O(n) 412 differ in the value represented because the functions have nested functions within. Function classAfunction O(n) 410 has a nested loop within which classBfunction O(n) 412 is also called. The complexity value is determined in a linear manner. The complexity value is calculated as the complexity of loops derived from a number of iterations of the loops. Further in the example, complexity rules 210 of FIG. 2 perform an asymptotical analysis of the combination of classAfunction O(n) 410 and classBfunction O(n) 412 to determine the entire function main 402 has an $O(n^2)$ complexity. A complexity rule for dealing with outside loops will sum the loop operations in a linear manner. A complexity rule may be defined to also determine complexity values for each path leading to a parent or may sum only at a parent.

Figure 5:
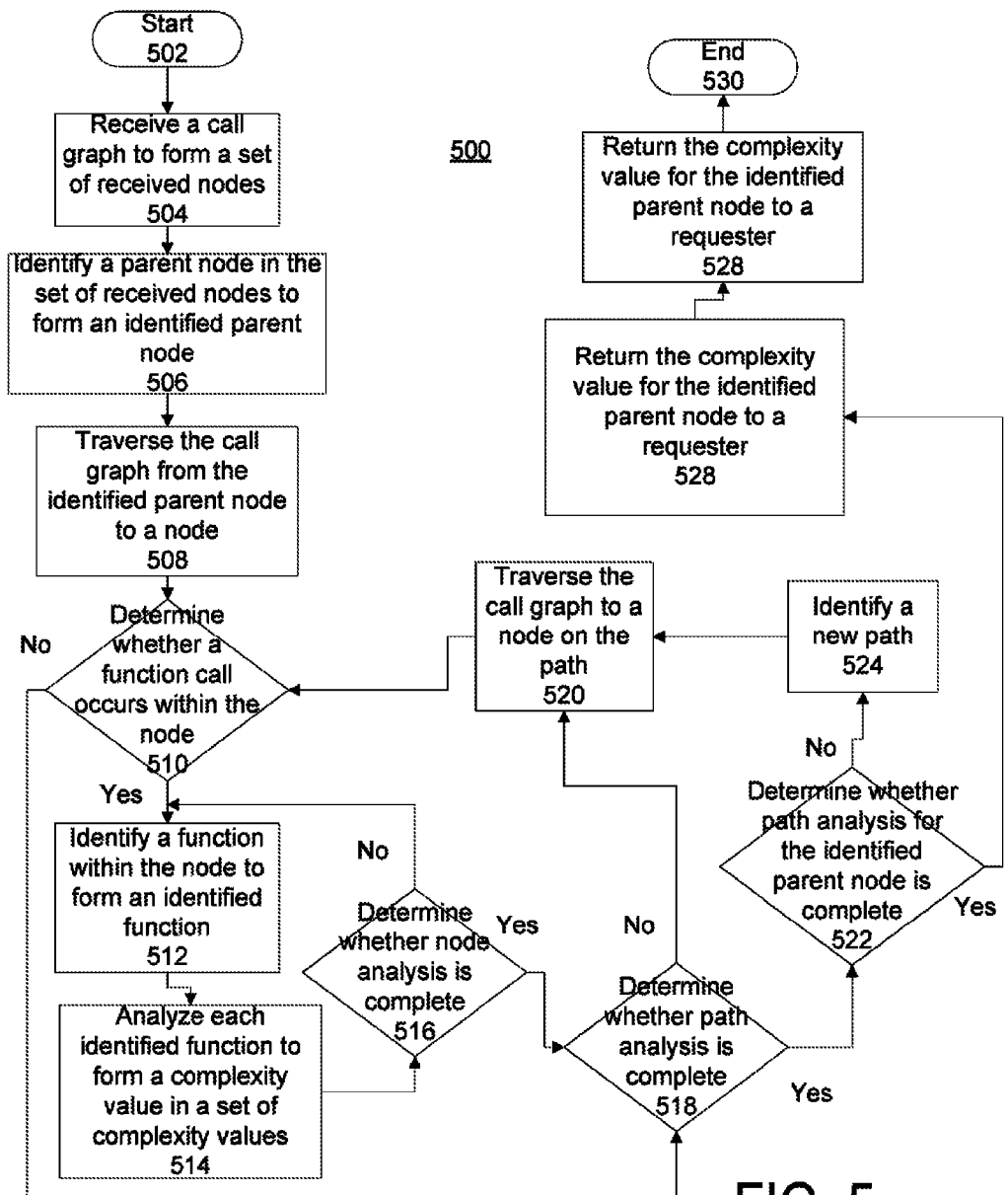
FIG. 5 is a flowchart of an algorithm complexity identification process using the analysis framework of FIG. 2, in accordance with various embodiments of the disclosure.

With reference to FIG. 5, a flowchart of an algorithm complexity identification process using the analysis framework of FIG. 2 in accordance with various embodiments of the disclosure is presented. Process 500 is an example of an algorithm complexity identification process using the analysis framework 202 of FIG. 2.

Process 500 starts (step 502) and receives a call graph to form a set of received nodes (step 504). The call graph may be further prepared to eliminate extraneous nodes prior to analysis. A node may be a function or recursive set of functions, such as a loop.

Process 500 identifies a parent node to form an identified parent node (step 506). The parent node is the anchor for a set of functions and forms the point at which a complexity value is reflected. Process 500 traverses the call graph from the identified parent node to a node (step 508). Traversal is top down through the length of the call graph.

Process 500 determines whether a function call occurs within the node (step 510). When a determination is made that a function call occurs within the node, a "yes" result is obtained. When a determination is made that a function call does not occur within the node, a "no" result is obtained. When a "no" result is obtained in step 510, process 500 skips to step 518. When a "yes" is obtained in step 510, process 500 identifies a function within the node to form an identified function (step 512). Analyze each identified function to form a complexity value in a set of complexity values is performed (step 514).

Process 500 determines whether node analysis is complete (step 516). When a determination is made that node analysis is complete, a "yes" result is obtained. When a determination is made that node analysis is not complete, a "no" result is obtained. When a "no" result is obtained in step 516, process 500 loops back to step 512 to process other functions. When a "yes" is obtained in step 516, process 500 determines whether path analysis is complete (step 518).

When a determination is made that path analysis is complete, a "yes" result is obtained. When a determination is made that path analysis is not complete, a "no" result is obtained. When a "no" result is obtained in step 518, process 500 traverses the call graph to another node on the path (step 520) with process 500 returning to step 510.

When a "yes" is obtained in step 518, process 500 determines whether path analysis for the identified parent is complete (step 522). When a determination is made that path analysis for the identified parent is complete, a "yes" result is obtained. When a determination is made that path analysis for the identified parent is not complete, a "no" result is obtained. When a "no" is obtained in step 522, process 500 identifies a new path (step 524). A new path within the scope of the same parent is identified with process 500 returning to step 520 to traverse the new path.

When "yes" result is obtained in step 522, process 500 sums the complexity values in the set of complexity values to form a complexity value for the identified parent (step 526). Process 500 returns the complexity value for the identified parent node to a requester (step 528) with process 500 terminating thereafter (step 530).

Illustrative embodiments thus provide a computer-implemented process, a computer program product and an apparatus for algorithm complexity identification through inter-procedural data flow analysis receives a call graph to form a set of received nodes in a static analysis framework, identifies a parent node in the set of received nodes to form an identified parent, traverses the call graph from the identified parent node to a node to identify a function within the node to form an identified function. Each identified function is analyzed to form a complexity value in a set of complexity values. Responsive to a determination that node analysis is complete, and responsive to a determination that path analysis is complete, determines whether path analysis for the identified parent is complete. Responsive to a determination that path analysis for the identified parent is complete, sum the complexity values in the set of complexity values for the identified parent and return the complexity value for the identified parent to a requester.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes, but is not limited to firmware, resident software, microcode and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of medium actually used. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms; for example, radio frequency and light wave transmissions. The computer readable medium may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, comprising:
receiving, in a static analysis framework, a call graph;
identifying a parent node of the call graph;
traversing the call graph from the parent node to a first child node along a first path of the call graph;
identifying a first function within the first child node;
analyzing the first function to form a first complexity value;
responsive to a determination that analysis of the first child node is complete, determining whether analysis of the first path is complete;
responsive to a determination that analysis of the first path is complete, calculating a parent complexity value;
responsive to a determination that analysis of the first path is not complete, traversing the call graph to a second child node of the first path;
identifying a second function within the second child node;
analyzing the second function to form a second complexity value; and
calculating the parent complexity value as the sum of the first complexity value and the second complexity value.

2. The method of claim 1, further comprising:
responsive to a determination that analysis of the first child node of the first path is not complete, identifying the second function within the first child node;
further analyzing the second function to form the second complexity value; and
further calculating the parent complexity value as the sum of the first complexity value and the second complexity value.

3. The method of claim 1, further comprising:
determining a quantity of recursive calls in a flow of an application represented by the first path, wherein the quantity of recursive calls is determined by the parent complexity value.

4. The method of claim 1, further comprising:
responsive to a determination that analysis of the first path is complete, and responsive to identifying a second path, traversing the call graph to a second child node of the second path;
identifying a second function within the second child node;
analyzing the second function to form a second complexity value; and
calculating the parent complexity value as the sum of the first complexity value and the second complexity value.

5. The method of claim 1, further comprising:
responsive to a determination that analysis of the first child node in the first path is not complete, identifying a second function within the first child node;
analyzing the second function to form a second complexity value;
responsive to a determination that analysis of the first path is not complete, traversing the call graph to a second child node in the first path;
identifying a third function within the second child node;
analyzing the third function to form a third complexity value;
responsive to a determination that analysis of the first path is complete, and responsive to identifying a second path, traversing the call graph to a third child node in the second path;
identifying a fourth function within the third child node;
analyzing the fourth function to form a fourth complexity value; and
calculating the parent complexity value as the sum of the first, second, third and fourth complexity values.

6. The method of claim 5, where the first complexity value is based on a complexity of loops derived from a number of iterations of the loops.

7. The method of claim 1, where the first complexity value is based on a complexity of loops derived from a number of iterations of the loops.

8. A computer program product comprising a non-transitory computer readable storage medium having computer readable program code embodied therewith, the computer readable program code comprising:
   computer readable program code configured to receive a call graph;
   computer readable program code configured to identify a parent node of the call graph;
   computer readable program code configured to traverse the call graph from the parent node to a first child node along a first path of the call graph;
   computer readable program code configured to identify a first function within the first child node;
   computer readable program code configured to analyze the first function to form a first complexity value;
   computer readable program code configured to determine whether analysis of the first path is complete in response to a determination that analysis of the first child node is complete; and
   computer readable program code configured to calculate a parent complexity value in response to a determination that analysis of the first path is complete.

9. The computer program product of claim 8, further comprising:
   computer readable program code configured to identify a second function within the first child node in response to a determination that analysis of the first child node of the first path is not complete;
   computer readable program code configured to analyze the second function to form a second complexity value; and
   computer readable program code configured to calculate the parent complexity value as the sum of the first complexity value and the second complexity value.

10. The computer program product of claim 8, further comprising:
    computer readable program code configured to traverse the call graph to a second child node of the first path in response to a determination that analysis of the first path is not complete;
    computer readable program code configured to identify a second function within the second child node;
    computer readable program code configured to analyze the second function to form a second complexity value; and
    computer readable program code configured to calculate the parent complexity value as the sum of the first complexity value and the second complexity value.

11. The computer program product of claim 8, further comprising:
    computer readable program code configured to traverse the call graph to a second child node of the second path in response to a determination that analysis of the first path is complete, and in response to identifying a second path;
    computer readable program code configured to identify a second function within the second child node;
    computer readable program code configured to analyze the second function to form a second complexity value; and
    computer readable program code configured to calculate the parent complexity value as the sum of the first complexity value and the second complexity value.

12. The computer program product of claim 8, further comprising:
    computer readable program code configured to identify a second function within the first child node in response to a determination that analysis of the first child node in the first path is not complete;
    computer readable program code configured to analyze the second function to form a second complexity value;
    computer readable program code configured to traverse the call graph to a second child node in the first path in response to a determination that analysis of the first path is not complete;
    computer readable program code configured to identify a third function within the second child node;
    computer readable program code configured to analyze the third function to form a third complexity value;
    computer readable program code configured to traverse the call graph to a third child node in a second path in response to a determination that analysis of the first path is complete, and in response to identifying the second path;
    computer readable program code configured to identify a fourth function within the third child node;
    computer readable program code configured to analyze the fourth function to form a fourth complexity value; and
    computer readable program code configured to calculate the parent complexity value as the sum of the first, second, third and fourth complexity values.

13. The computer program product of claim 12, where the first complexity value is based on a complexity of loops derived from a number of iterations of the loops.

14. The computer program product of claim 8, where the first complexity value is based on a complexity of loops derived from a number of iterations of the loops.

15. An apparatus, comprising:
    a storage device comprising computer executable program code; and
    a processor coupled to the storage device, where the processor executes the computer executable program code to direct the apparatus to:
       receive a call graph;
       identify a parent node of the call graph;
       traverse the call graph from the parent node to a first child node along a first path of the call graph;
       identify a first function within the first child node;
       analyze the first function to form a first complexity value;
       determine whether analysis of the first path is complete in response to a determination that analysis of the first child node is complete; and
       calculate a parent complexity value in response to a determination that analysis of the first path is complete.

16. The apparatus of claim 15, where the processor further executes the computer executable program code to direct the apparatus to:
    identify a second function within the first child node in response to a determination that analysis of the first child node of the first path is not complete;
    analyze the second function to form a second complexity value; and
    calculate the parent complexity value as the sum of the first complexity value and the second complexity value.

17. The apparatus of claim 15, where the processor further executes the computer executable program code to direct the apparatus to:
  traverse the call graph to a second child node of the first path in response to a determination that analysis of the first path is not complete;
  identify a second function within the second child node;
  analyze the second function to form a second complexity value; and
  calculate the parent complexity value as the sum of the first complexity value and the second complexity value.

18. The method of claim 1, wherein the first function comprises a first loop, wherein the second function comprises a second loop, wherein the first loop comprises a function call to the second loop, wherein the first complexity value for the first function is linear, wherein the second complexity value for the second function is linear, and wherein the parent complexity value derived from the sum of the first complexity value and the second complexity value is exponential.

19. The method of claim 1, wherein said analyzing of the first function and the second function is performed by an analysis framework, wherein the analysis framework comprises a rules framework and a set of parsers and providers, wherein the rules framework is a set of static analysis rules that detects errors in an application that is represented by the call graph, wherein the set of parsers and providers is a set of functions that supply information about features of the application, and wherein the information is supplied by pre-collecting data about the application.

20. The method of claim 1, further comprising:
  removing extraneous nodes from the call graph before analyzing the first function and the second function, wherein the extraneous nodes represent dead branches of code that exist within an application but are not executed.

* * * * *